United States Patent Office 3,147,275
Patented Sept. 1, 1964

3,147,275
IMIDAZOLINE DERIVATIVES
Wolfgang Fruhstorfer and Helmut Muller-Calgan, Darmstadt, Germany, assignors to E. Merck Aktiengesellschaft, Darmstadt, Germany
No Drawing. Filed Sept. 21, 1961, Ser. No. 139,592
Claims priority, application, Germany,
Sept. 30, 1960, M 46,696
3 Claims. (Cl. 260—309.6)

This invention relates to the preparation of novel imidazoline derivatives.

The principal object of this invention is to prepare 2-(2',6'-dimethyl-3'-hydroxy-4'-tertiary butylbenzyl)-2-imidazoline corresponding to the following formula:

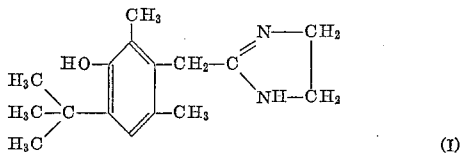

(I)

Another object of this invention is to prepare acid addition salts of the aforementioned imidazoline derivatives.

Still another object is to treat the smooth muscular system with these derivatives in order to obtain a contraction effect; and also to treat the circulatory system in order to obtain blood vessel constricting and blood pressure increasing properties.

Still further objects of this invention are to prepare intermediate chemical compounds for the preparation of the aforementioned imidazoline derivatives.

Upon further study of the specification and appended claims, other objects and advantages of the present invention will become apparent.

The new imidazoline derivatives as described by Formula I and the acid addition salts thereof can be produced by several alternative processes. Fundamentally, though, all the processes employ as one raw material 2,6-dimethyl-3-hydroxy-4-tertiary butyl-phenyl acetic acid or a functional acid derivative thereof, and as the other reactant, either ethylenediamine or N-acyl derivatives thereof, or a mixture of ammonia or an ammonia-yielding substance with a compound which can be converted into ethylenediamine or N-acyl derivatives thereof by treatment with ammonia. Thus, it is apparent that the novel imidazoline derivatives corresponding to Formula I can be formed either directly in one step or indirectly in several steps.

As functional acid derivatives of the 2,6-dimethyl-3-hydroxy-4-tertiary butyl-phenyl acetic acid, it is possible to use, for example, esters, orthoesters, acid halogenides, preferably the acid chloride, amides, thioamides, amidines, imino ether, thioiminoether, imino halogenides or the nitrile. Furthermore, reaction conditions may be selected so that the functional acid derivatives are formed only during the reaction.

Besides ethylenediamine itself, reactive N-derivatives may also be used. Especially useful derivatives of ethylenediamine are those which yield imidazoline which is unsubstituted at the nitrogen atoms when converted with carboxylic acids or functional derivatives thereof. Compounds of this type are, for example, N-acylethylenediamine wherein the acyl groups preferably have 2–4 carbon atoms, furthermore, N,N'-diacylethylenediamine which may also be of cyclic nature such as, for example, ethylenethiourea.

Compounds which can be converted into ethylenediamine by treatment with ammonia are, for example, ethanolamine and the esters thereof, β-halogen-ethylamine, such as β-chloro-ethylamine, ethylenedihalogenide, such as 1,2-dichloroethane or ethylene chlorohydrin. Ethylenediamine or the derivatives thereof may be used as free bases or in the form of the mono- or di-salts thereof. For example, ethylenediamine may be employed as the mono-p-toluene sulfonic acid salt.

An acid amide for example, may have the same effects as ammonia, so that when 2,6-dimethyl-3-hydroxy-4-tertiary butylphenyl-acetamide is converted with bromoethylamine, there also occurs a ring closure to form the imidazoline derivative.

If the nitrile of 2,6-dimethyl-3-hydroxy-4-tertiary butylphenyl acetic acid is used as the basic material and is converted with ethylenediamine or the derivatives thereof, it is preferable to accomplish the conversion in the presence of hydrogen sulfide or a hydrogen sulfide-yielding compound, such as carbon disulfide.

The described conversions can lead directly or indirectly to the imidazoline derivative of Formula I.

Thus, intermediate compounds of Formula Ia, for example, are formed in some cases:

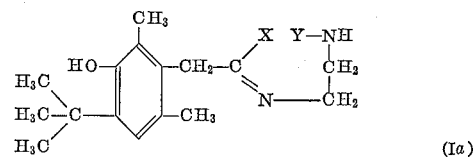

(Ia)

wherein X is OH, SH or $NH_2$; and Y is H or an acyl group having from 1 to 10 carbon atoms, preferably from 1 to 6 carbon atoms.

From compounds of this type, or from their tautomeric forms, the substituents X and Y may be separated according to conventional methods, as XY. It is possible, for example, to separate water from a compound of Formula Ia, wherein X equals OH and Y equals H, by utilizing calcium oxide as the dehydrating means. Thereby, the desired imidazoline derivative of Formula I is formed.

Furthermore, intermediate compounds of Formula Ib are formed in some cases;

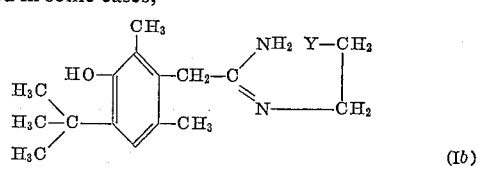

(Ib)

wherein Y is a substitutent capable of being replaced by an amino group, such as OH or a halogene.

The substituent Y in the form of HY may be separated from these compounds or their tautomeric forms, while forming the imidazoline ring. Intermediates of this type are relatively unstable compounds which are readily converted into the desired imidazoline compound of Formula I by merely boiling them in a suitable inert solvent, whereby HY is separated. This reaction is particularly smooth when Y represents a halogen. The conversions, however, also yield good results when Y is OH and when the reaction is conducted under dehydrating conditions.

Still further intermediates obtained in the indirect formation of the imidazoline derivatives of Formula I compounds are compounds of Formula Ic:

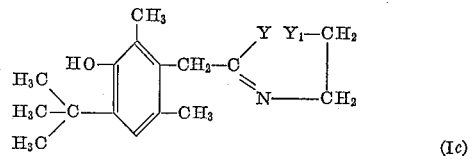

(Ic)

wherein Y and $Y_1$ are substituents capable of being replaced by an amino group, such as halogen.

If a compound of this type or their tautomeric forms thereof is treated with ammonia or an ammonia-yielding compound, the imidazoline derivative of Formula I is obtained. The conversion process is smooth, especially when Y and $Y_1$ represent a halogen, preferably chlorine.

Moreover, in accordance with the teachings of this invention, the imidazoline derivative of Formula I can be obtained by the isomerization of the following derivatives:

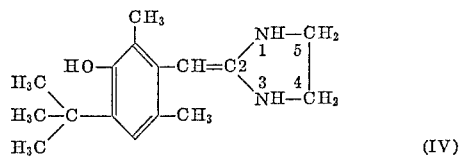

(IV)

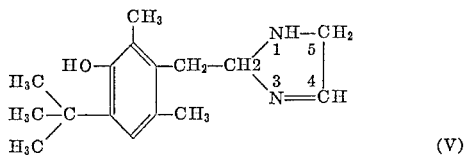

(V)

The double bond at the 2-carbon in Formula IV or the double bond in the 3,4 position—Formula V, respectively, is rearranged to the 2,3 position. These isomerization reactions are preferably accomplished in an acidic aqueous solution, for example, in the presence of a small excess of hydrochloric acid. Isomerization occurs by either leaving the reaction mixture at room temperature, or by slightly heating the reaction solution.

Depending on the method employed, the novel imidazoline derivative is obtained either as the free base or in the form of one of the acid addition salts thereof. Various acid addition salts may be obtained from the free base by treatment with acids, according to the usual methods. For the production of such salts only pharmaceutically acceptable acids, i.e., those which yield physiologically unobjectionable acid addition salts, can be employed, such as hydrohalide acids, particularly hydrobromic and hydrochloric; sulfuric acid; orthophosphoric acid; aliphatic carboxylic acids, like acetic acid, propionic acid and the higher homologs up to 12 carbon atoms thereof; polybasic acids such as oxalic acid, tartaric acid, succinic acid, maleic acid, ascorbic acid, citric acid, etc.; sulfonic acids, such as methane sulfonic acid, ethane sulfonic acid, benzenesulfonic acid or p-toluene sulfonic acid; aromatic carboxylic acids, such as benzoic acid, salicylic acid and p-amino salicylic acid.

The new imidazoline derivative conforming to Formula I can also be obtained from a compound of Formula III:

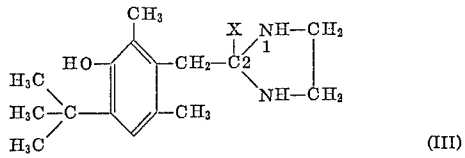

(III)

wherein X is OR or halogen; and R is H, acyl having from 1 to 10 carbon atoms, preferably from 1 to 6 carbon atoms, or preferably an aliphatic hydrocarbon radical having from 1 to 6 carbon atoms, preferably from 1 to 4 carbon atoms.

Formula I is obtained by separating the substituent X as HX. If X represents halogen, the separation is accomplished under the conventional conditions of a halogen hydrogen separation, for example, by treatment with collidine or pyridine. If X represents a hydroxyl radical, the separation is accomplished by treatment with a dehydrating medium. If R represents an aromatic or a higher aliphatic acyl substituent, e.g., the benzoyl substituent, the 1,2 double bond in the imidazoline ring can be produced by mere heating with the concomitant separation of benzoic acids.

The new imidazoline derivative of Formula I as well as the acid addition salts thereof can be employed in all types of pharmaceutical preparations, utilizing, if necessary, the conventional excipients.

Due to its blood vessel constricting properties, the new imidazoline derivative is particularly suitable for reducing the swelling of mucous membranes, especially the mucuous membrane of the nose. As a matter of fact, the new drug exhibits a highly unexpected superiority over known drugs usually used for this purpose. For example, the compound conforming to Formula I exhibits, as compared to the known 2-(naphthyl-1'-methyl)-2-imidazoline (A), twice the constriction, and lasts about 2½ to 3 times as long; as compared to the 2-(2',6'-dimethyl-4'-tertiary butyl-benzyl)-2-imidazoline (B) it exhibits 5 times the constriction, lasting 1½ to 2 times longer. Analyzing the comparison to compound B, it is indeed very surprising that the addition of the hydroxyl group, which theoretically should render the molecule more easily susceptible to rapid metabolism in the body, not only increases the constriction effect 500%, but also increases the duration of the effect 50–100%. These aforementioned comparisons were obtained by employing the following test procedure:

An aqueous solution of 2-(2',6'-dimethyl-3'-hydroxy-4'-tertiary butylbenzyl)-2-imidazoline and of the compared substances A and B was injected each to a series of demedullate and decerebrate rats. Activity and active duration of the preparations was determined by measuring the raise in blood pressure.

Inasmuch as the new compound also increases the blood pressure, it can also be used as a circulatory medicine for shocks. In this case, the compound of Formula I is applied by injection or "permanent drip infusion" in a sterilized, physiological salt solution.

For a more detailed description of the invention, the following non-limitative specific embodiments are presented:

*Example 1*

10 g. 2,6-dimethyl-3-hydroxy-4-tertiary butylbenzylcyanide (produced by chloromethylation of 2,4-dimethyl-6-tertiary butyl-phenol and conversion of the substituted benzyl chloride with NaCN: from alcohol, crystals melting at 135–137° C.) and 10.7 g. ethylenediamine-mono-p-toluenesulfonate are heated in an oil bath to approximately 235° C. for 1½ hours, whereby ammonia is evolved. The free base is obtained from the p-toluenesulfonic acid imidazoline salt which is difficultly soluble in water, by conversion with 50 cc. of a 10% NaOH solution. Said base is recrystallized from benzene, and 7.5 g. (62% of the theoretical yield) 2-(2',6'-dimethyl-3'-hydroxy - 4' - tertiary butylbenzyl) - 2-imidazoline, melting point 180–182° C., are obtained.

By dissolving the free base in an ethyl alcohol solution of hydrochloric acid and adding ether, the hydrochloride can be produced in the usual manner. Said hydrochloride melts, when recrystallized from alcoholic ether, at 300–303° C. and is decomposed.

*Example 2*

29 g. of 2,6-dimethyl-3-hydroxy-4-tertiary butylbenzyl-cyanide, 9 g. of approximately 95% ethylenediamine and 0.7 cc. carbon disulfide are heated to approximately 100° C. for forty-eight hours, whereby NH₃ is evolved. After cooling, the solidified reaction product is dissolved in hot benzene and is left to crystallize. Twenty-six g. (75% of the theoretical yield) of the compound I is obtained, which melts, after repeated recrystallization from benzene, at a temperature of 181–183° C.

*Example 3*

11.8 g. of 2,6 - dimethyl - 3-hydroxy-4-tertiary butyl-phenylacetic acid and 11.6 g. of ethylenediamine-mono-p-toluenesulfonate are heated in an oil bath to 220–250° C. for three hours. After cooling, the resinous residue is treated with approximately 50 cc. of 10% aqueous sodium hydroxide and the base deposited thereby is, after vacuum filtration and drying, recrystallized from benzene or petroleum ether. The melting point is 180° C., and the yield is 6.1 g. (47% of the theoretical yield).

*Example 4*

4.7 g. of ethylenediamine are added slowly under cooling with ice to 0.05 mol 2,6-dimethyl-3-hydroxy-4-tertiary butylphenyl acetyl chloride. After the reaction, a bath temperature of 200–230° C. is attained and the reaction mixture is kept at this temperature for approximately two hours. After cooling, the residue is treated with approximately 50 cc. 10% aqueous sodium hydroxide and the resultant base is extracted twice with 30 cc. chloroform. After evaporation of the chloroform, the base is dissolved in 40 cc. 10% hydrochloric acid and the neutralized compounds are removed by ether extraction. By adding an excess of a 10% sodium hydroxide solution to the acidic aqueous extract there is obtained the base, which, recrystallized from benzene or benzene-petroleum ether after vacuum filtration and drying, has a melting point of 178–180° C.

*Example 5*

11.75 g. of 2,6 - dimethyl-3-hydroxy-4-tertiary butylphenylacetamide and 11.6 g. of ethylenediamine-mono-p-toluenesulfonate are heated in an oil bath to approximately 200° C. for three hours. Proceeding according to Example 3, there is obtained 8.1 g. of compound I (corresponding to 62% of the theoretical yield), and having a melting point of 181–183° C.

*Example 6*

10.85 g. of 2,6 - dimethyl-3-hydroxy-4-tertiary butylbenzylcyanide and 7.2 g. of N,N-diacetyl-ethylenediamine are heated in an oil bath to approximately 250° C. for three hours. After cooling, the residue is treated with approximately 50 cc. 10% sodium hydroxide solution, whereby a dark oil is deposited. From said oil the basic components are isolated, as described in Example 4.

*Example 7*

10.85 g. of 2,6 - dimethyl-3-hydroxy-4-tertiary butylbenzylcyanide and 5.1 g. of 2-mercaptoimidazoline are heated in an oil bath to approximately 250° C. for three hours. The residue is treated as described in Example 4, and there is obtained 4.3 g. of compound I (corresponding to 33% of the theoretical yield) having a melting point of 180–182° C.

*Example 8*

0.05 mol of crude 2,6-dimethyl-3-hydroxy-4-tertiary butylphenyl-acetiminoethylether-hydrochloride are added to a solution of 4.0 g. ethylenediamine-monohydrate in 40 cc. absolute alcohol, and the reactants are then boiled under reflux for four hours. After distilling off the alcohol, the residue is treated with approximately 50 cc. of 10% sodium hydroxide solution and treated according to Example 4. The melting point of the resultant base is 179–180° C.

*Example 9*

11.75 g. of 2,6-dimethyl-3-hydroxy-4-tertiary butylphenylacetamide and 10.25 g. of β-bromo-ethylamine-hydrobromide are heated to a bath temperature of about 200–230° C. for three hours. The residue is treated according to Example 4, and there is obtained 1.7 g. of compound I, which melts after being recrystallized from benzene at 180–181° C.

*Example 10*

11.75 g. of 2,6-dimethyl-3-hydroxy-4-tertiary butylphenylacetamide and 10.3 g. of 1,2 dibromoethane are converted in the autoclave with 10 g. of liquid $NH_3$ and are shaken at a temperature of 200–250° C. for four hours. After cooling and evolution of the excess ammonia, the experiment is conducted according to Example 4. The resultant product, Compound I, melts after recrystallization from benzene or petroleum ether at 180° C.

It will be understood that the invention is susceptible to modification in order to adapt it to different usages and conditions and, accordingly, it is desired to comprehend such modifications within the invention as may fall within the scope of the appended claims.

What is claimed is:

1. A compound selected from the group consisting of 2 - (2',6'-dimethyl-3'-hydroxy-4'-tertiary butylbenzyl)-2-imidazoline and acid addition salts of said imidazoline derivative with pharmaceutically acceptable acids.

2. 2 - (2',6' - dimethyl - 3'-hydroxy-4'-tertiary butylbenzyl)-2-imidazoline.

3. Acid addition salts of 2-(2',6'-dimethyl-3'-hydroxy-4'-tertiary butylbenzyl)-2-imidazoline with pharmaceutically acceptable acids.

References Cited in the file of this patent

UNITED STATES PATENTS

| | | |
|---|---|---|
| 2,745,783 | Haefliger | May 15, 1956 |
| 2,868,802 | Hueni | Jan. 13, 1959 |
| 2,888,458 | Stromberg | May 26, 1959 |
| 2,890,985 | Marsh et al. | June 16, 1959 |
| 2,957,003 | Johnson | Oct. 18, 1960 |
| 2,971,006 | Mayhew | Feb. 7, 1961 |

OTHER REFERENCES

Scholz: Ind. Eng. Chem., vol. 37, pages 120–25 (1945).

Hofmann: "Imidazole and Its Deriv.," pages 224–5 (1953).